United States Patent
Mongeau et al.

(10) Patent No.: US 9,926,958 B2
(45) Date of Patent: Mar. 27, 2018

(54) METHOD AND APPARATUS FOR LIMITING COMPRESSION BETWEEN FLANGES OF A SEALED STRUCTURE

(71) Applicant: Ford Motor Company, Dearborn, MI (US)

(72) Inventors: Michael Peter Mongeau, Farmington Hills, MI (US); Sai K. Perumalla, Rochester Hills, MI (US); Rajaram Subramanian, Ann Arbor, MI (US); Jason C. Marcath, Dearborn, MI (US)

(73) Assignee: FORD MOTOR COMPANY, Dearborn, MI (US)

( * ) Notice: Subject to any disclaimer, the term of this patent is extended or adjusted under 35 U.S.C. 154(b) by 341 days.

(21) Appl. No.: 14/698,990

(22) Filed: Apr. 29, 2015

(65) Prior Publication Data
US 2016/0319854 A1   Nov. 3, 2016

(51) Int. Cl.
*F16B 5/02* (2006.01)
*F16B 33/00* (2006.01)
*F16B 37/06* (2006.01)

(52) U.S. Cl.
CPC .............. *F16B 5/02* (2013.01); *F16B 33/004* (2013.01); *F16B 37/061* (2013.01)

(58) Field of Classification Search
CPC ........................................................ F16B 5/02
USPC ................... 411/366.1, 103, 108; 403/408.1
See application file for complete search history.

(56) References Cited

U.S. PATENT DOCUMENTS

| | | | | |
|---|---|---|---|---|
| 1,630,875 A | * | 5/1927 | Wagenhorst | B60B 3/16 301/35.54 |
| 1,915,630 A | * | 6/1933 | Tichenor | F16B 33/00 411/366.1 |
| 1,998,936 A | * | 4/1935 | Luce | G09F 7/00 411/352 |
| 2,509,980 A | * | 5/1950 | McCallum | A43C 15/161 36/62 |
| 2,784,758 A | | 3/1957 | Rohe | |
| 2,936,806 A | | 5/1960 | Harper | |
| 3,414,304 A | * | 12/1968 | Miller | F16B 29/00 403/408.1 |
| 3,749,450 A | * | 7/1973 | Senter | B60B 3/14 301/35.631 |
| 4,197,030 A | * | 4/1980 | Debaigt | F16B 5/02 403/24 |

(Continued)

FOREIGN PATENT DOCUMENTS

CN   201884425 U   6/2011

*Primary Examiner* — Gary W Estremsky
(74) *Attorney, Agent, or Firm* — Maria Johnston; Brooks Kushman P.C.

(57) ABSTRACT

A two-part fastener for an assembly having a sealed joint formed by at least two flanges or sealing surfaces. A first flange defines a first opening, a second flange defines a second opening with a seal being disposed between the first and second flanges. The flanges and seal are secured together with a bolt and a receiver that defines a threaded hole for receiving the bolt. The receiver includes an end face engaging the first flange and a shoulder engaging the second flange. The spacing between the end face and the shoulder defines a gap for the seal. The shoulder of the receiver may include a weld bead that is welded to the second flange. In one embodiment, three flanges are assembled together with a seal between each flange.

15 Claims, 3 Drawing Sheets

(56) References Cited

U.S. PATENT DOCUMENTS

| | | | | |
|---|---|---|---|---|
| 4,448,565 A * | 5/1984 | Peterson | ................... | F16B 5/02 |
| | | | | 403/408.1 |
| 5,183,286 A * | 2/1993 | Ayabe | ...................... | B60G 7/02 |
| | | | | 280/124.1 |
| 5,502,982 A * | 4/1996 | Venetucci | ................. | F17C 3/04 |
| | | | | 312/236 |
| 6,189,902 B1 * | 2/2001 | Lenzen, Jr. | .............. | B62D 3/12 |
| | | | | 280/93.515 |
| 7,733,667 B2 * | 6/2010 | Qin | ........................ | H05K 7/142 |
| | | | | 174/138 E |
| 8,641,347 B2 | 2/2014 | Bisset et al. | | |
| 8,777,535 B2 * | 7/2014 | Manahan | .............. | E05B 65/001 |
| | | | | 411/107 |
| 8,804,370 B2 * | 8/2014 | Lu | ........................ | G11B 33/124 |
| | | | | 361/801 |
| 8,899,867 B2 * | 12/2014 | Tatomir | ................... | A42B 3/20 |
| | | | | 403/168 |
| 2003/0235465 A1 * | 12/2003 | Geringer | ................ | B62D 55/00 |
| | | | | 403/408.1 |
| 2007/0258791 A1 * | 11/2007 | Davies | ................... | B60R 13/01 |
| | | | | 411/397 |
| 2013/0108392 A1 * | 5/2013 | Henriksen, Jr. | ....... | F16B 37/122 |
| | | | | 411/166 |

* cited by examiner

METHOD AND APPARATUS FOR LIMITING COMPRESSION BETWEEN FLANGES OF A SEALED STRUCTURE

TECHNICAL FIELD

This disclosure relates to a two-part fastener for an assembly having a sealed joint formed by at least two flanges or sealing surfaces.

BACKGROUND

Parts assembled together with fasteners securing two or more flanges together to be sealed against fluid leakage may present a problem because it is preferred that the fastener be tightened to a specified load, i.e. 75% proof load, in a hard joint while seal performance is improved if a soft joint is provided and the seal is not over compressed. A seal between flanges that is over compressed may leak because the seal may be distorted or compression set over time. A wide variety of assemblies include a seal assembled between flanges to prevent leakage of gaseous or liquid fluids between the flanges. Examples of assemblies that include seals between flanges include—but are not limited to—battery packs, fluid filled tanks, engine oil pans, transmission cases and differential cases.

One approach to limiting the extent of compression of a seal between two or more flanges is to assemble a compression limiter between the flanges. The compression limiter is assembled between flanges and receives, or is in close proximity to, a bolt used to secure the flanges together. The compression limiter fills the space between the flanges where the seal is disposed. The bolt is threaded into a separate nut and is then fully tightened or tightened to a specified load against the compression limiter. Compression limiters add cost to an assembly corresponding to the cost of the compression limiter. In addition, added assembly steps are required to assemble the bolt, the nut, and the compression limiter to the assembled flanges. The compression limiter must be held between the flanges to bridge the seal as the bolt is threaded into the nut complicating the assembly process.

This disclosure is directed to overcoming the above problems and other problems as summarized below.

SUMMARY

According to one aspect of this disclosure, an article of manufacture is disclosed that comprises a first flange defining a first opening, a second flange defining a second opening and a seal disposed between the first and second flanges. The flanges and seal are secured together with a bolt and a receiver that defines a bore for receiving the bolt. The receiver may be a nut that includes an end face engaging the first flange and a shoulder engaging the second flange. The spacing between the end face and the shoulder defines a gap for the seal.

According to other aspects of this disclosure, the shoulder of the receiver may include a weld bead that is welded to the second flange. The receiver may include a spacing portion having a diameter that is sized to be inserted into the second opening and a backing portion on an opposite end of the receiver. The shoulder is disposed between the spacing portion and the backing portion. The first opening may have a diameter "d" sufficient to receive a shaft of the bolt and the second opening may have a diameter "D" sized to receive a spacing portion of the receiver. The diameter "D" of the second opening is larger than the diameter "d" of the first opening. The internal diameter "d" can be either threaded to mate with a bolt or may be a clean bore in which threads will be formed by the threads on a thread-forming bolt.

The seal defines a seal opening for receiving a spacing portion of the receiver disposed between the end face of the receiver and the shoulder. The gap for the seal corresponds to a predetermined gap between the first flange and the second flange provides for the desired degree of compression of the seal.

The article may further comprise a third flange defining a third opening and a second seal disposed between the second flange and the third flange. The receiver may include a shoulder engaging the second flange with the third flange being disposed between the seal and the second seal. The spacing between the shoulder and the first flange defines a second gap for the seal, the third flange, and the second seal. The receiver may include a spacing portion having a diameter that is inserted into the second opening and the third opening and a backing portion on an opposite end of the receiver from the spacing portion. The shoulder is disposed between the spacing portion and the backing portion.

The first opening may have a diameter "d" sized to receive a shaft of the bolt, the second opening may have a diameter "D" sized to receive a spacing portion of the receiver. The diameter "D" of the second opening is larger than the diameter "d" of the first opening.

The seal may define an opening for receiving a spacing portion of the receiver disposed between the end face of the receiver and the shoulder. A second seal may define a second seal opening for receiving a second portion of the receiver and is disposed between the second flange and the third flange. The gap for the seal corresponds to a predetermined gap between the first flange and the second flange corresponding to the spacing of the first flange and the second flange that provides for nominal compression of the seal. The second gap for the second seal corresponds to a second predetermined gap between the second flange and the third flange corresponding to the spacing of the second flange to the third flange that provides for a desired degree of compression of the second seal.

This concept can be applied to assemblies constructed of metal, plastic, composite, or a combination of different types of materials. This concept may be applied to battery packs having a plurality of cells inside the battery pack that are sealed from the exterior of the pack. A plurality of bolt positions are provided in flanges that are disposed around the battery pack that incorporate the compression limiting fastener. While this disclosure refers to seals between the flanges it should be understood that a gasket is one type of seal that may be provided that includes multiple holes for a plurality of fasteners. This concept is adaptable to automotive applications such as battery packs, transmissions, differentials, and engine oil pans but is not limited to automotive applications and may be applied to weather proof boxes, signs, pressure vessels, waterproof camera cases, and underwater applications.

According to another aspect of this disclosure, a method of assembling parts together is disclosed. The method comprises providing a first part having a first flange that defines a first opening and providing a second part having a second flange that defines a second opening. A seal defines a seal opening and is assembled between the first flange and second flange. A fastener having a threaded shaft and a receiver are provided with the receiver including a spacing portion including an end face that defines a threaded hole and includes a shoulder. The receiver is assembled to the second part and into the second opening and the seal opening with the end face contacting the first flange and the shoulder contacting the second flange. The threaded fastener is inserted into the first opening in the first flange and into the threaded hole in the receiver.

According to other aspects of this disclosure as it relates to the method of assembling parts together, the method may further comprise welding the receiver to the second flange.

The method may further comprise providing a third part having a third flange that defines a third opening and assembling a second seal defining a second seal opening between the second flange and the third flange. The shoulder contacts the second flange and the spacing portion extends through the third opening in the third flange.

The method may further comprise defining a gap between the first flange and the second flange for the seal that provides for a desired degree of compression of the seal.

According to other aspects of the method, the receiver may include a spacing portion that is inserted into the second opening having a diameter "D" and a backing portion on an opposite end of the receiver from the spacing portion and the shoulder may be disposed between the spacing portion and the backing portion. The first opening may have a diameter "d" sized to receive a shaft of the bolt and the second opening may have a diameter "D" sized to receive a spacing portion of the receiver. The diameter "D" of the second opening is larger than the diameter "d" of the first opening.

The above aspects of this disclosure and other aspects are described below with reference to the attached drawings.

DETAILED DESCRIPTION

The illustrated embodiments are disclosed with reference to the drawings. However, it is to be understood that the disclosed embodiments are intended to be merely examples that may be embodied in various and alternative forms. The figures are not necessarily to scale and some features may be exaggerated or minimized to show details of particular components. The specific structural and functional details disclosed are not to be interpreted as limiting, but as a representative basis for teaching one skilled in the art how to practice the disclosed concepts.

Figure 1:
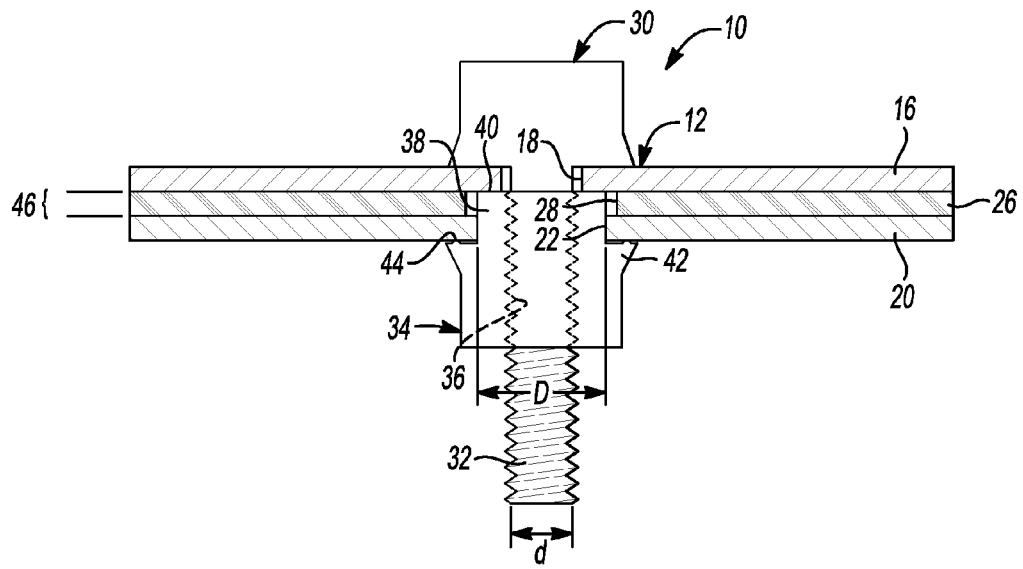
FIG. 1 is a cross-sectional view of an assembly including a sealed joint formed by a seal disposed between two flanges.
Figure 2:
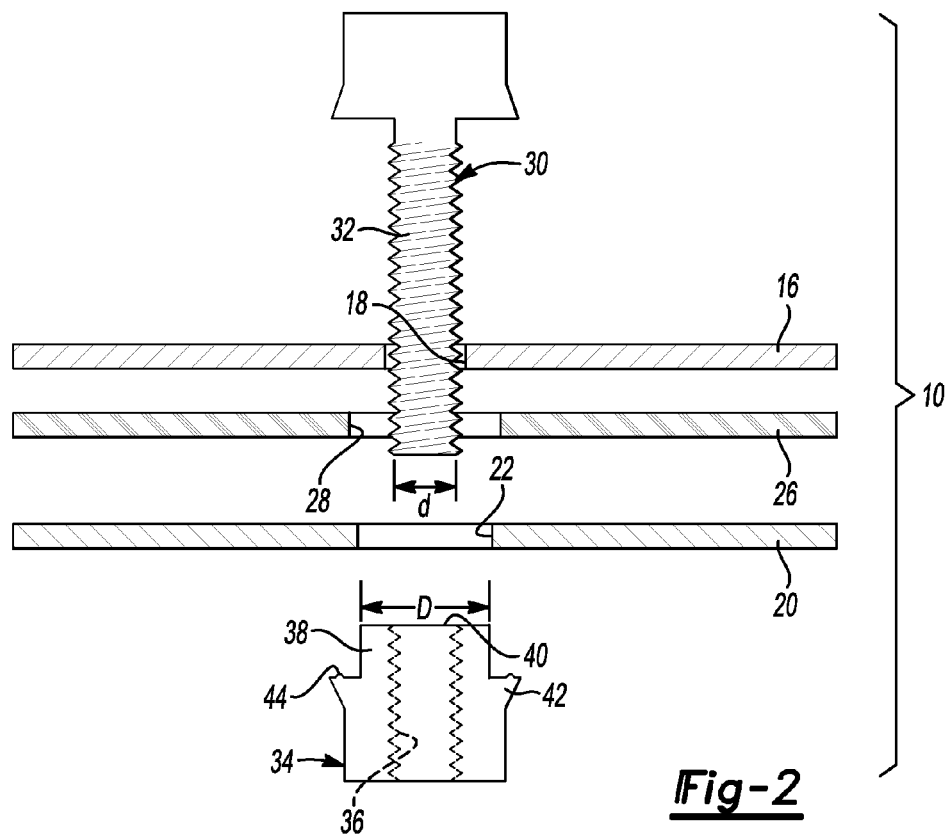
FIG. 2 is an exploded cross-sectional view of the assembly shown in FIG. 1.

Referring to FIGS. 1 and 2, an assembly 10 is partially illustrated that includes a sealed joint 12 formed between a first flange 16 that defines a first opening 18 and a second flange 20 that defines a second opening 22. A seal 26 defines a seal opening 28. The seal 26 is disposed between the first flange 16 and the second flange 20. The seal opening 28 is coaxially aligned with the first opening 18 and the second opening 22. A bolt 30, or threaded fastener, is used to secure the first flange 16 to the second flange 20. The bolt 30 includes a threaded shaft 32 that is inserted into the first opening 18, the seal opening 28, and the second opening 22.

A weld nut 34 defines a threaded hole 36 (or clean bore that will have threads formed by the bolt) that is adapted to receive the threaded shaft 32 of the bolt 30. Weld nut 34 includes a cylindrical spacing portion 38 on one end. The cylindrical spacing portion 38 includes an end face 40 that is adapted to engage the first flange 16. The weld nut 34 includes a shoulder 42 that engages the second flange 20. The shoulder 42 preferably includes a weld bead 44 comprising a circular rib or a plurality of raised areas arranged in a circular array. The weld bead 44 is provided to facilitate welding the weld nut 34 to the second flange 20. The weld nut 34 is preferably welded to the second flange 20 prior to assembling the first flange 16, the second flange 20, and the seal 26 together. A gap 46 is defined between the first flange 16 and the second flange 20 to accommodate the seal 26. The gap 46 is a predetermined gap that provides for a desired degree of compression of the seal. The spacing portion 38 establishes the width of the gap 46. The width of the gap 46 corresponds to the spacing between the end face 40 when it engages the first flange 16 and the inner side of the second flange 20 with the shoulder 42 engaging the second flange 20.

The diameter of the first opening 18 is referred to as diameter "d". The diameter "d" is slightly larger than the threaded shaft 32 to permit insertion of the threaded shaft 32 into the first opening 18. The diameter of the spacing portion 38 is slightly less than the diameter of the second opening 22 so that the spacing portion 38 may be received within the second opening 22 in the second flange 20. The diameter "D" of the second opening 22 is larger than the diameter "d" of the first opening 18. The end face 40 engages the first flange 16 around a first opening 18 to establish the gap for the seal 26.

Figure 3:
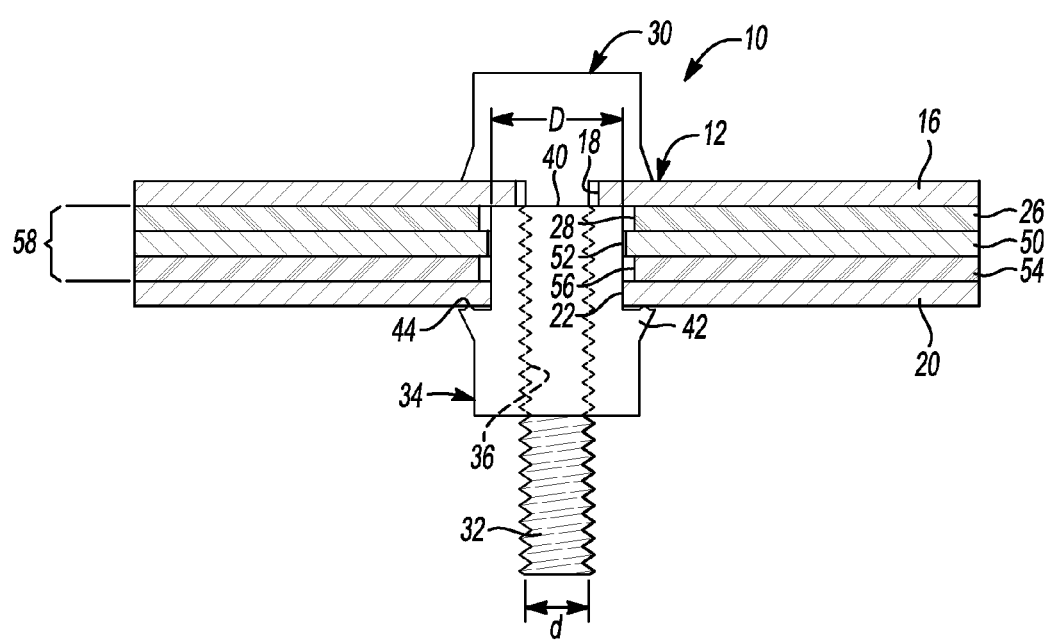
FIG. 3 is a cross-sectional view of an assembly including a sealed joint formed by two seals disposed between three flanges.
Figure 4:
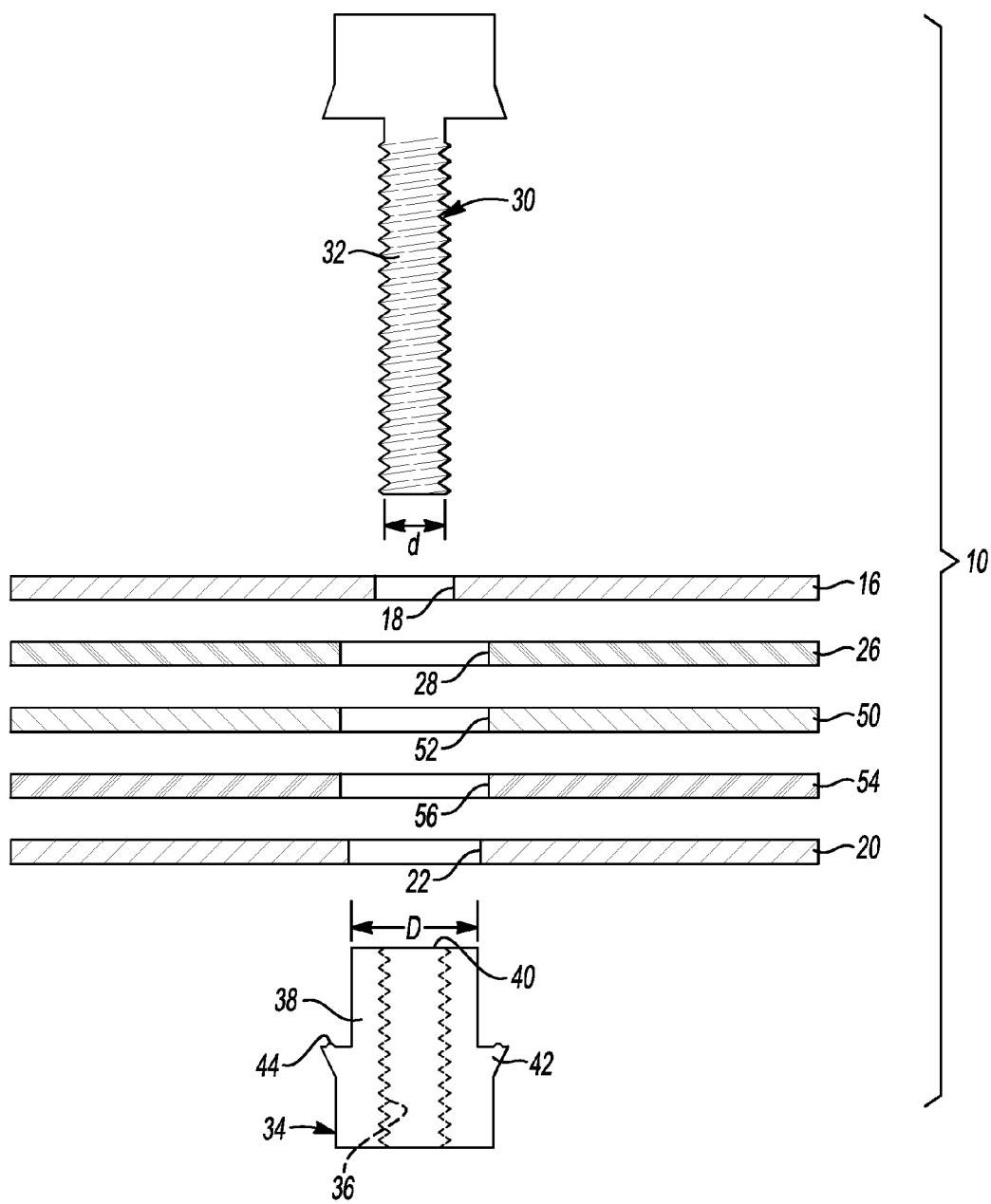
FIG. 4 is an exploded cross-sectional view of the sealed joint of the article shown in FIG. 3.

Referring to FIGS. 3 and 4, another embodiment is illustrated in which three flanges are assembled together with a seal between each of the flanges. The same reference numerals are used to describe similar elements shown in the embodiments of FIGS. 1 and 2. A third flange 50 is provided that defines a third opening 52. The third flange 50 is sealed relative to the first flange 16 by the seal 28. The third flange 50 is sealed relative to the second flange 20 by the second seal 54 that defines a second seal opening 56.

The first flange 16 including the first opening 18 is engaged by the threaded fastener 30 with the threaded shaft 32 being inserted into the first opening 18. The weld nut 34 is welded to the second flange 20 with the spacing portion 38 of the weld nut 34 extending through the second opening 22 in the second flange 20 and the third opening 52 defined by the third flange 50. The spacing portion 38 also extends through the seal opening 28 and the second seal opening 56. The end face 40 engages the first flange 16 while the shoulder 42 is welded to and engages the second flange 20.

A gap 58 is defined between the first flange 16 and the second flange 20. The gap 58 provides for a desired degree of compression of the seal 26 and second seal 54. The diameter "D" of the second opening 22 is larger than the diameter "d" of the first opening 18 so that the end face 40 engages the first flange 16 around the first opening 18. When the threaded shaft 32 is tightened into the threaded hole 36 of the weld nut 34, the force exerted on the first flange 16 and second flange 20 and the amount of compression of the first seal 26 and second seal 54 is limited because the end face 40 engages the first flange 16.

The embodiments described above are specific examples that do not describe all possible forms of the disclosure. The features of the illustrated embodiments may be combined to form further embodiments of the disclosed concepts. The words used in the specification are words of description rather than limitation. The scope of the following claims is broader than the specifically disclosed embodiments and also includes modifications of the illustrated embodiments.

What is claimed is:

1. An article comprising:
   a first flange defining a first opening;
   a second flange defining a second opening;
   a seal disposed between the first and second flanges;
   a threaded bolt; and
   a receiver defining a bore for receiving the threaded bolt, the receiver including an end face engaging the first flange and a shoulder including a weld flange welded to the second flange, the end face spacing from the shoulder defining a gap for the seal.

2. The article of claim 1 wherein the receiver includes a spacing portion having a diameter that is insertable into the second opening and a backing portion on an opposite end of the receiver, wherein the shoulder is disposed between the spacing portion and the backing portion.

3. The article of claim 1 wherein the first opening has a diameter "d" sized to receive a shaft of the bolt and the second opening has a diameter "D" sized to receive a spacing portion of the receiver from the spacing portion, wherein "D" is larger than "d".

4. The article of claim 1 wherein the seal defines a seal opening for receiving a spacing portion of the receiver disposed between the end face of the receiver and the shoulder.

5. The article of claim 1 wherein the gap for the seal corresponds to a predetermined gap between the first flange and the second flange corresponding to a spacing between the first flange and the second flange for compressing the seal.

6. The article of claim 1 further comprising:
   a third flange defining a third opening; and
   a second seal disposed between the second flange and the third flange, wherein the shoulder engages the second flange with the third flange being disposed between the seal and the second seal, wherein spacing between the shoulder and the first flange defines a second gap for the seal, the third flange and the second seal.

7. The article of claim 6 wherein the receiver includes a spacing portion having a diameter that is inserted into the second opening and the third opening, and a backing portion on an opposite end of the receiver from the spacing portion, wherein the shoulder is disposed between the spacing portion and the backing portion.

8. The article of claim 6 wherein the first opening has a diameter "d" sized to receive a shaft of the bolt, the second opening and the third opening have a diameter "D" sized to receive a spacing portion of the receiver, wherein "D" is larger than "d".

9. The article of claim 6 wherein the seal defines an opening for receiving a spacing portion of the receiver disposed between the end face of the receiver and the shoulder, and the second seal defines a second seal opening for receiving a second portion of the receiver disposed between the second flange and the third flange.

10. The article of claim 6 wherein the gap for the seal corresponds to a predetermined gap between the first flange and the second flange corresponding to a spacing of the first flange, the second flange and the third for compressing the seal and the second seal.

11. A method of assembling parts together comprising:
    providing a first part having a first flange that defines a first opening;
    providing a second part having a second flange that defines a second opening;
    assembling a seal that defines a seal opening between the first flange and second flange;
    providing a fastener that has a threaded shaft;
    providing a receiver including a spacing portion including an end face and a shoulder, the receiver defining a bore; and
    assembling the receiver to the second part and into the second opening and the seal opening with the end face contacting the first flange and the shoulder contacting the second flange, and wherein the threaded shaft of the fastener is inserted into the first opening in the first flange and into the bore in the receiver, and welding the receiver to the second flange.

12. The method of claim 11 further comprising:
    providing a third part having a third flange that defines a third opening; and
    assembling a second seal defining a second seal opening between the second flange and the third flange, wherein the shoulder contacts the second flange and the spacing portion extends through the third opening in the third flange.

13. The method of claim 11 wherein the first flange and the second flange define a gap for the seal that provides for a desired degree of compression of the seal.

14. The method of claim 11 wherein the spacing portion of the receiver is inserted into the second opening having a diameter "D", wherein the receiver includes a backing portion on an opposite end of the receiver from the spacing portion, wherein the shoulder is disposed between the spacing portion and the backing portion.

15. The method of claim 11 wherein the first opening has a diameter "d" sized to receive the threaded shaft of the fastener and the second opening has a diameter "D" sized to receive the spacing portion of the receiver, wherein the "D" is larger than "d".

* * * * *